United States Patent [19]

Hayes et al.

[11] Patent Number: 4,646,251

[45] Date of Patent: Feb. 24, 1987

[54] COMPUTER GRAPHICS, PARAMETRIC PATCH PARALLEL SUBDIVISION PROCESSOR

[75] Inventors: Alan B. Hayes; Russell A. Brown; Thomas W. Jensen; Bruce K. Madsen, all of Salt Lake City, Utah

[73] Assignee: Evans & Sutherland Computer Corporation, Salt Lake City, Utah

[21] Appl. No.: 783,492

[22] Filed: Oct. 3, 1985

[51] Int. Cl.⁴ .............................................. G06F 15/66
[52] U.S. Cl. .................................................... 364/518
[58] Field of Search ........................ 364/518, 521, 522

[56] References Cited

U.S. PATENT DOCUMENTS

3,889,107  6/1975  Sutherland ...................... 364/518 X
4,360,884  11/1982  Okada et al. ........................ 364/521

Primary Examiner—Michael L. Gellner
Attorney, Agent, or Firm—Nilsson, Robbins, Dalgarn, Berlinger, Carson & Wurst

[57] ABSTRACT

A system is disclosed for subdividing parametric patches for use in a computer graphics system to develop images. The system utilizes initial data, provided as by an interactive user, to represent control points for an initial patch from which the system rapidly computes control points for subpatches using parallel processors. The disclosed system is recursive so that each level of subdivision leads to greater refinement of an initial patch. In one embodiment, the processors in the system compute multiple control points, the grouping of processors exploiting patch symmetrical properties.

19 Claims, 9 Drawing Figures

COMPUTER GRAPHICS, PARAMETRIC PATCH PARALLEL SUBDIVISION PROCESSOR

BACKGROUND AND SUMMARY OF THE INVENTION

Recent years have seen considerable advancement in the use of computers to form pictures. Somewhat more specifically, the field of computer graphics involves the generation, representation, manipulation, processing, and evaluation of graphic objects with computers. Graphic objects created with the aid of a computer may or may not have an existing physical form. That is, using the techniques of computer graphics, pictures or graphic objects may be created without physical models, pictures, or drawings as those terms apply in a traditional sense. For example, a graphic object may be defined by a computer in terms of an abstract description (model) that can be transformed into a corresponding picture on a display surface as the face of a cathode ray tube.

Using computer graphics, displayed pictures typically are generated by manipulating or modifying mathematical representations of primitive geometrical shapes. That is, desired images may be created by processing primitive shapes such as squares and triangles with operations as those called "union" or "intersection". For example, a primitive shape of a house may be created by adding a triangle (representative of a roof) to a square (representative of walls). More complex images require the use of shapes with more complex curves and surfaces.

A person interacting with a computer may provide data (either directly or from the computer's memory) sufficient to specify a primitive image for display on a screen. That image then may be enhanced to a desired form by processing the basic data. In that regard, techniques and structures have been proposed for creating smooth appearing images in graphic displays. For example, see an article in *Scientific American*, September 1984, entitled "Computer Software for Graphics". With continuing work in the field of computer graphics, a persistent need has been revealed for structures to expedite and simplify the creation of desired images.

Somewhat recently, mathematical science has recognized the feasibility of using combinations of parametric patches as curved primitives to create graphic images. Such combinations of patches may be used to form complex images, much as a collection of cloth patches are joined to form a quilted bedspread. Patches provide flexibility and can represent both planar and curved surfaces. They can be generated by the parameterization of certain rational polynomial functions. Such techniques have been treated in the literature. For example, see INTERACTIVE COMPUTER GRAPHICS by Wolfgang K. Giloi, 1978, Prentice-Hall, Inc., specifically Chapter 4 entitled "Interpolation and Approximation of Curves and Surfaces"; GEOMETRIC PRINCIPLES AND PROCEDURES FOR COMPUTER GRAPHIC APPLICATIONS by Sylvan H. Chasen, 1978, Prentice-Hall, Inc., see Chapter 2, "Creating a Mathematical Formulation to Match Constraints"; and COMPUTATIONAL GEOMETRY FOR DESIGN AND MANUFACTURE by I. D. Faux and M. J. Pratt, John Wiley & Son, 1979, see Chapter 7, "Composite Surfaces".

One approach utilizing parametric patches is based on a method developed by Bezier and is described in the above texts. A polyhedron, e.g. rectangle, is used to outline a desired surface. The vertices of the polyhedron thus control the shape of the generated patch. The vertices are known as control points. Note that the control points at the corners of the patch lie on the polyhedron.

Parametric patch techniques are well suited for interactive computer graphics because a user may control the shape of patches simply by altering the position or the number of control points. Generally, a rough approximation of a desired surface can be accomplished by a user defining some initial control points. By subdividing a patch of a rough approximation into subpatches the image can be refined. As a technique, patch subdivision is treated in a book PRINCIPLES OF INTERACTIVE COMPUTER GRAPHICS by Newman and Sproull, 2nd Edition, 1979, McGraw-Hill, Inc., and in an article, "An Algorithm and Data Structure for 3D Object Synthesis Using Surface Patch Intersections", by Wayne E. Carlson appearing in *Computer Graphics*, July 1982, Vol. 16, No. 3 (ACMO-89791-076-1/82/007/0255).

Subdivision in this context is any process which exactly converts a parametric patch to several smaller ones. A number of control points for an initial patch are employed in well known equations for computing a similar number of control points for each subpatch. Thus, subdivision of a patch is accomplished by computing the coordinates of additional control points to further shape the surface as defined by subpatches. The motivation for subdivision is that progressive subdivision produces subpatches with control points that are progressively closer to the desired surface.

It has been proposed to perform patch subdivision on a general purpose computer. However, that approach is relatively slow and is not generally suitable for interactive computer use. Essentially, a need exists for an economical system to rapidly compute the coordinates for control points in the subdivision of parametric patches. The related apparatus for providing working data and for displaying resulting data is complex and voluminous but well known in the prior art. Accordingly, the system hereof is described in the form of a component. The place and use of the component in a composite computer graphics system will be readily apparent to persons of ordinary skill in the art.

In general, the system of the present invention operates in cooperation with a host computer. Signals are received from the host computer representative of initial control points definitive of a parametric patch. A plurality of parallel processors receive the control points simultaneously. In accordance with one disclosed embodiment, the signals representative of the control points are provided in a so-called "canonical" sequence which indicates the positional relationship of the control points. In this embodiment, a counter identifies the control points. In another disclosed embodiment, a name in the form of a single integer value is assigned to identify each control point.

As disclosed herein, each of the parallel subdivision processors may receive signals representative of control points to compute the coordinates of a distinct subpatch control point. However, in an alternative embodiment as disclosed herein, subdivision processors compute the coordinates of multiple control points.

Once a level of subdivision is completed, the subpatch control points are received by the host computer and stored. In that regard, the total processing time involves the intervals required to output the initial patch control points to the subdivision processors, during which time the computation of subpatch control points occurs, plus the intervals to input and store the subpatch control points into the host computer. The process is recursive so that further levels of subdivision expeditiously lead to greater refinement of the generated image.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENTS

Detailed illustrative embodiments of the present invention are disclosed herein; however, they are merely representative, recognizing that a wide variety of specific embodiments of the disclosed system are possible. Nevertheless, the illustrative embodiments are deemed to afford the best embodiments for purposes of disclosure and to provide a basis for the claims herein which define the scope of the present invention.

Figure 1A:
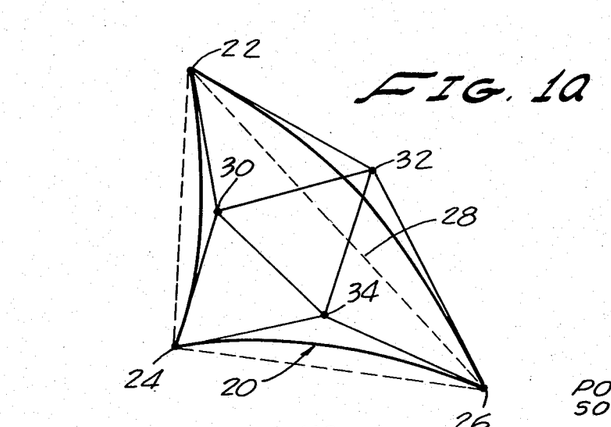
FIGS. 1a, 1b, and 2c are graphic representations of a triangular parametric patch related to a triangle, and illustrated to be subdivided in accordance with aspects of the present invention.

Initially, some graphic representations may be helpful with regard to patch concepts. Referring initially to FIG. 1a, a quadratic, triangular Bezier patch 20 is represented by solid lines, the shape being somewhat like an inflated sail. The vertex or corner control points 22, 24, and 26 of the patch 20 are coincidentally the vertices of a triangle 28 (dashed lines). In this case, the patch is roughly triangular in shape. That is, it may be considered to be a "curved" triangle. The other control points, e.g. points 30, 32, and 34 are neither on the patch 20 nor in the plane of the triangle 28.

Figure 1B:
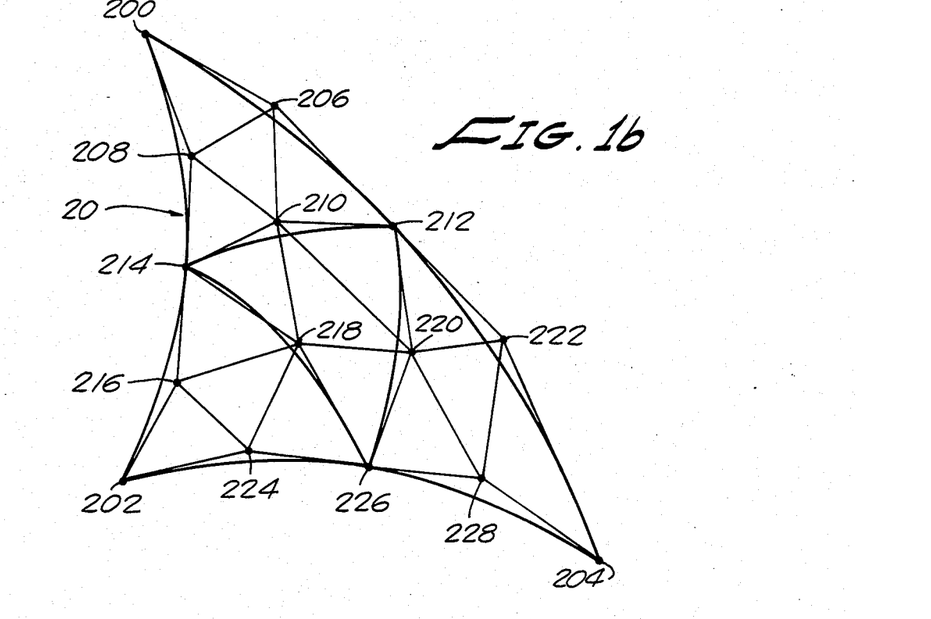

Normally, a triangular patch is mimicked by principal features of an associated triangle. Essentially, by progressively subdividing a patch into subpatches, the desired shape can be progressively more nearly approximated. For example, note the triangles represented in fine lines in FIG. 1a which are created by connecting the control points 22, 24, 26, 30, 32, and 34 and which convey a convex form approximating the form of the patch 20. Note that in FIG. 1b the patch 20 has been subdivided into four subpatches which are represented by solid lines. The control points 200 through 228 (even numbers) have been created by subdivision and define the four subpatches. Note further the triangles represented in fine lines in FIG. 1b which are created by connecting the control points 200 through 228 and which convey a convex form more closely approximating the patch 20 than does the convex form shown in FIG. 1a.

Figure 2A:
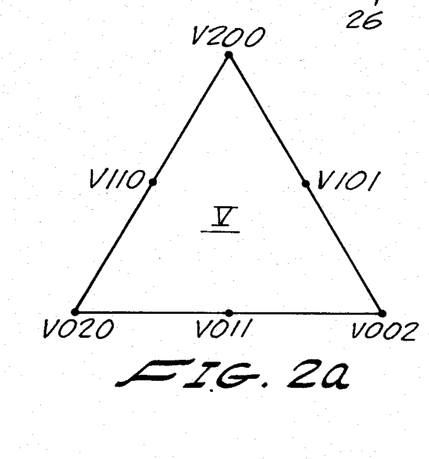
FIGS. 2a and 2b are diagrammatic representations to illustrate the subdivision process.
Figure 2B:
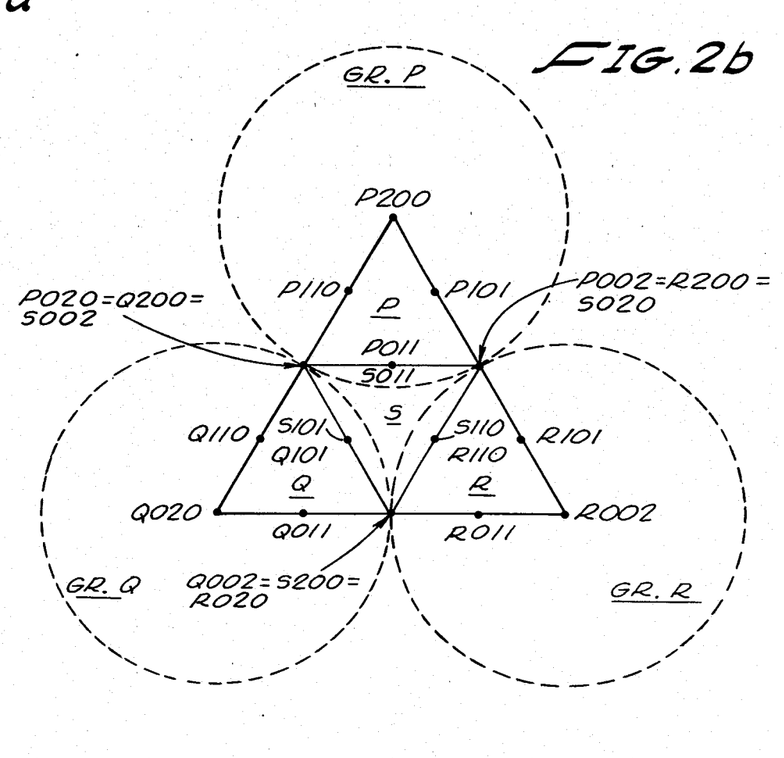

FIG. 2 illustrates the subdivision of a quadratic, triangular Bezier patch V (FIG. 2a) to produce subpatches P, Q, R, and S (FIG. 2b). Note the naming conventions to describe the control points of the patches. In that regard, while the numerals are usually in subscript form, in the interest of convenience and ease of printing, subscripts are not employed. Also note that certain of the subpatch control points are shared by subpatches, e.g. the control point P020=Q200=S002. Again, the triangular patches V, P, Q, R, and S are illustrated for association with quadratic, triangular Bezier patches; however in that regard, only the vertices of the triangles will coincide with the vertex control points of the Bezier patches.

As illustrated in FIG. 2b, a patch is specified by a single letter, for example patch V. Control points are specified by adding three decimal digits to the designating letter, for example control point V020. Though convenient for explanation, in the illustrative embodiment, these names are not formatted in the computer signals representing control points. Rather, representative single integers are used, or the positions of the control points are determined in a canonical sequence.

Figure 2C:
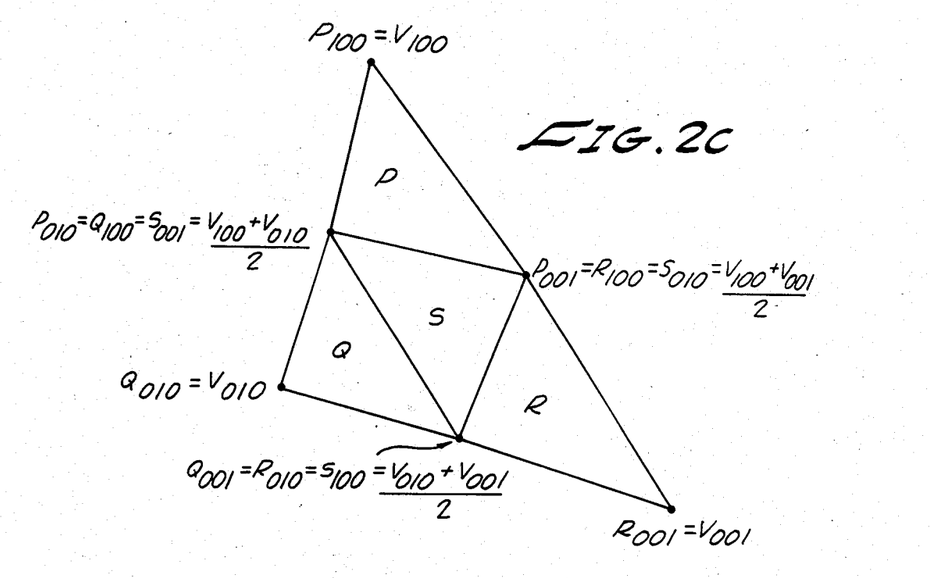

Subdivision is basically a process of computing convex combinations, i.e. a process whereby a weighted average of patch control points produces a subpatch control point. The simplest example of subdivision is illustrated in FIG. 2c wherein a linear, triangular Bezier patch is subdivided uniformly to create four subpatches. Linear refers to the fact that the sides of the patch are straight lines and that the patch is actually a planar triangle. Uniform subdivision refers to the fact that subdivision of the patch creates subpatches which (in the case of a linear patch) are all the same size. Thus, uniform subdivision of a linear, triangular Bezier patch is accomplished through bisection of each edge of that patch. Bisection of an edge is accomplished by averaging the two endpoints of that edge. For example, a control point P010 is calculated as follows:

$$P010 = (V100 + V010)/2.$$

A somewhat more complicated example is the case of uniform, one-to-four subdivision of a quadratic, triangular Bezier patch as illustrated in FIGS. 2a and b. Quadratic refers to the fact that the sides of the patch are quadratic curves, for example, parabolae. Uniform subdivision refers to the fact that subdivision of the patch creates subpatches which are all roughly equal in size. In the case of uniform, one-to-four subdivision of a quadratic, triangular Bezier patch, a control point P020 is calculated as follows:

$$P020 = (V200 + 2V110 + V020)/4.$$

Generally, algorithms for calculating subpatch control points are well known. Specifically, such algorithms are disclosed in an article "Subdivision Algorithms for Bezier Triangles" from the journal *Computer-Aided Design*, Ronald N. Goldman, Vol. 15, No. 3, (May 1983), pp. 159–166. Various subdivisions of triangles have been proposed. However, in the disclosed embodiments, a Bezier triangle is split into four subpatches as illustrated in FIG. 2.

Figure 3:
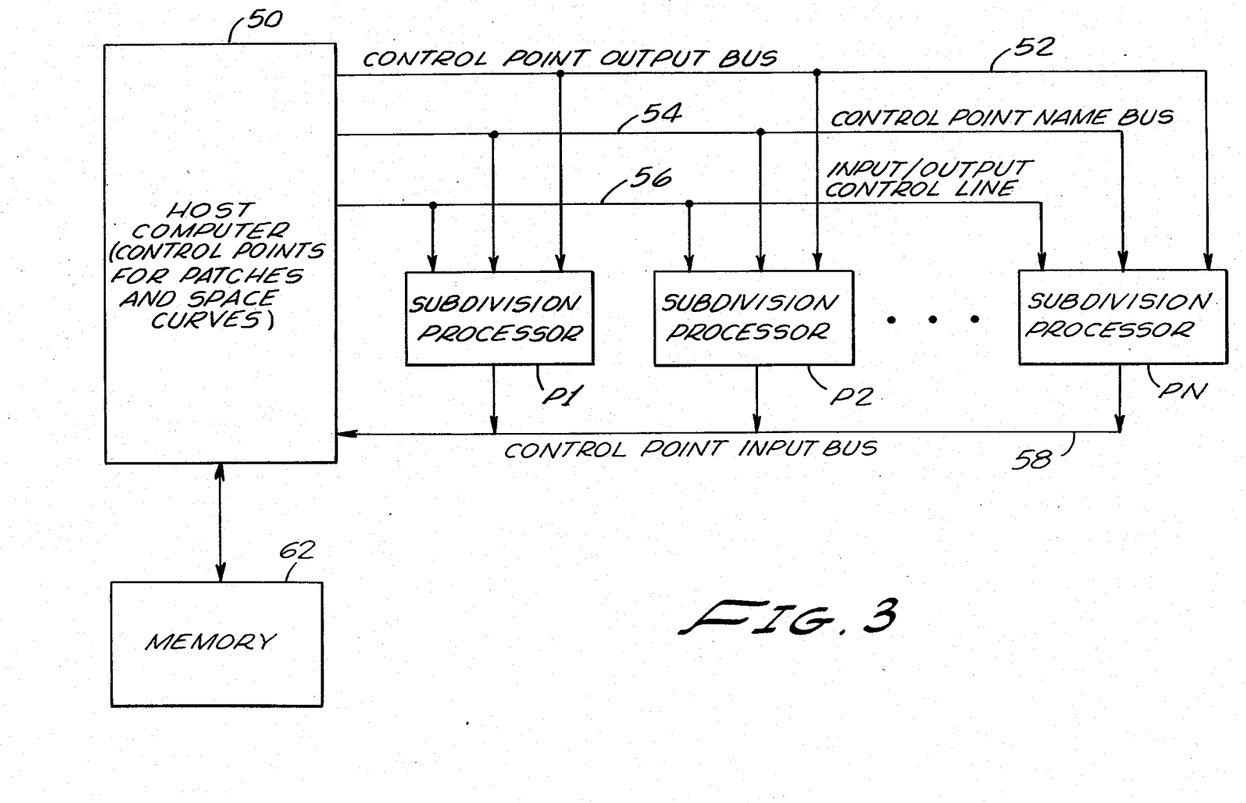
FIG. 3 is a block diagram representative of an embodiment of a system in accordance with the present invention.

FIG. 3 shows a system in accordance herewith for performing subdivision. Specifically, a host computer 50 supplies signals representative of control points to a plurality of subdivision processors P1 and P2 through PN. Specifically, the host computer 50 provides signals representative of individual control points to the subdivision processors P through a control point output bus 52. As the signals on the bus 52 are applied to each of the subdivision processors P, it is necessary to identify individual control point signals. Accordingly, the host computer 50 provides designation signals to a control point name bus 54.

It is also necessary for the host computer to specify the immediate function of the subdivision processors P, i.e., either to receive signals representative of control points or provide signals representative of control points. That function is accomplished by signals supplied to the processors P through an input/output control line 56. Essentially, the control line 56 affords binary control. For example, if the line 56 manifests a one bit by the high state of a binary signal, an input to the host computer from the processors P is commanded. On the contrary, if the control line 56 is at a low level (manifesting a zero bit), the control processors P are commanded to receive signals from the host computer 50. Input signals from the processors P are returned to the host computer through an input bus 58.

Contrasted to the simple binary format of the control line 56, the buses 52, 54, and 58 carry numerical data naming control points and specifying values of control points. The signals in the name bus 54 specify the name of a control point. The control point output bus 52 and input bus 58 specify values for each of the components X, Y, Z and W to define each control point. Consequently, computing values for a single control point involves the computation of four components of that control point, e.g. X, Y, Z, and W. Accordingly, in the processors as illustrated, the multiplier 76 (FIG. 4) actually comprises four individual multipliers which are coupled to individual adders, registers, dividers, and gates. Thus, the multiplier 103 (FIG. 5) as represented is a gang multiplier actually comprising four separate multipliers for the quantities X, Y, Z, and W. Similarly, the adder 80 comprises four components as does the register 86, the divider 90, and the gate 94. Such values for designating the control point are either accepted from the host computer 50 through the output bus 52 or returned to the host computer 50 through the input bus 58. Control of the choice is accomplished by the host computer 50 utilizing well known structures of the prior art. In that regard, note that the host computer 50 utilizes a memory 62 which stores control point data in process in a retrievable format.

Exemplary detailed subdivision processors for use as the processors P1 and P2 through PN are disclosed below. However, preliminarily consider an exemplary operation by the system of FIG. 3 to accomplish the exemplary subdivision as illustrated in FIG. 2.

As indicated above, computing the control point P020 (FIG. 2b, top) involves the operation: (V200+2V110+V020)/4. Thus, computing the control point P020 involves the control points: V200, V110, and V020. Computing other control points, e.g. P110, P101, and so on involves the use of different control points of the V series as illustrated in FIG. 2.

In the operation of the system of FIG. 3, signals representative of the control points V are sequentially supplied to the output bus 52 while, simultaneously, signals representative of the control point names are supplied to the name bus 54 during a time when the subdivision processors P are commanded to receive such data. The subdivision processors P accept signals representative of those control points V necessary for their computation of the individual control point to be calculated. For example, assuming the subdivision processor P1 is to compute the control point P020 (FIG. 2b, top), it will accept input signals representative of the control points V200, V110, and V020. Other of the subdivision processors P, e.g. P2 through PN, will similarly accept those control points essential for the calculation each is to perform.

When all of the patch control points V have been supplied to the buses 52 and 54, the processors P will have calculated subpatch control points for input to the computer 50 through the input bus 58. Note that, in sequence, the input bus 58 accepts one subpatch control point to be input from one processor P during one time interval. Accordingly, the host computer 50 receives subpatch control points, one at a time, placing them in memory. The total processing time for the subdivision process can accordingly be equal to the number of time intervals required to output the patch control points to the processors P plus the number of time intervals needed to input the subpatch control points from the processors P to the host computer 50.

Figure 4:
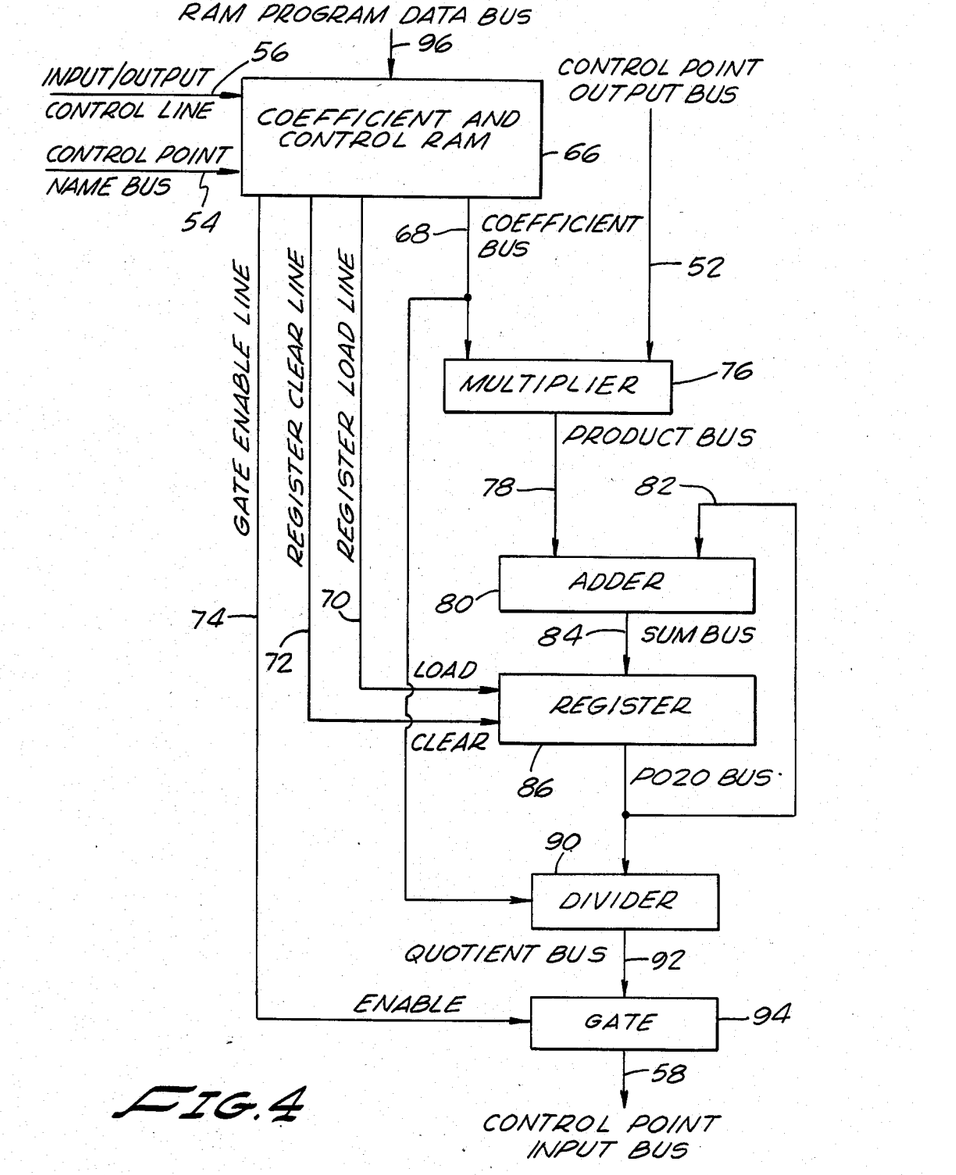
FIG. 4 is a block diagram representative of a component of the system of FIG. 3.

Pursuing the exemplary computation of the subpatch P200, as assumed for subdivision processor P1, reference will now be made to FIG. 4 illustrating a detailed form for the processor P1. Note that the buses previously identified with respect to FIG. 3 for connection to the host computer 50 bear the same reference numerals in FIG. 4.

The name bus 54 and the control line 56 are coupled to a random access memory (RAM) 66 which applies signals to a coefficient bus 68, a register load line 70, a register clear line 72, and a gate enable line 74. These signals, applied by the RAM 66, control the operation of the subdivision processor and are applied by the RAM in response to the signals which are provided to the RAM 66. Specifically, during a given time interval, the signals from the name bus 54 and control line 56 are merged to form address signals which select a word in the RAM 66. The word selected contains the signals which are applied to the coefficient bus 68, the register load line 70, the register clear line 72, and the gate enable line 74. Such RAMs are well known in the prior art related to integrated circuits. The function of such RAMs to provide distributed signals in response to address signals is also well known.

As stated, the signals provided from the RAM 66 dictate the operation of the subdivision processor during each specific time interval and are provided in response to signals provided to the RAM during that same time interval via the name bus 54 and the control line 56. Thus, the RAM contains a program for operation of the subdivision processor. This program consists of a series of words and is loaded into the RAM at some time prior to actual subdivision computation via a RAM program data bus 96. Note that the program loaded is specific to the control point to be calculated by the subdivision processor; thus, the particular control point calculated by a subdivision processor is determined by the program loaded into the processor's RAM and is in accord with the calculations as explained above. Note that it is possible to load different programs into a single subdivision processor's RAM at different times; therefore, a single subdivision processor may calculate different control points at different times, dependent only upon the program loaded. An example of a specific program will be discussed later in conjunction with a discussion of the operation of a subdivision processor.

The coefficient bus 68 (from the RAM 66) is connected to a divider 90 and to a multiplier 76. The multiplier 76 also receives control point signals from the host computer 50 (FIG. 3) through the control point output bus 52. Signals from the multiplier 76 (FIG. 4) are supplied through a product bus 78 to an adder 80 with a second input 82. The output from the adder 80 is supplied through a sum bus 84 to a register 86 controlled by the lines 70 and 72. The register 86 is also connected to supply signals to the bus 82 (returning to the adder 80) and to a divider 90. The output from the divider 90 is supplied to a quotient bus 92 for qualified passage through a gate 94 which may be enabled by a signal in the line 74 to provide signals to the control point input bus 58. As suggested above, there are four sets of multipliers 76, adders 80, registers 86, dividers 90, and gates 94, one set for each of X, Y, Z, and W. However, all four sets are controlled by a single set of coefficient bus 68, register load line 70, register clear line 72, and gate enable line 74.

Consider the operation of the processor P1 of FIG. 4 to generate the subpatch control point P020 in accordance with the formula above. That is, consider the computation of P020 (FIG. 2) involving the arithmetic combination of control points (component values) from the patch V (FIG. 2). Specifically:

$$P020 = (V200 + 2V110 + V020)/4.$$

For convenience, assume that the signals representative of control points V200, V110, and V020 appear in that order in the control point output bus 52 and the control point name bus 54. Note that while signals in the control point output bus 52 manifest the value of a control point, normally in terms of X, Y, Z, and W, signals in the control point name bus 54 designate the specific control point represented.

As was stated previously, the signals in the control point name bus 54 are designated by single integers; thus, a specific control point is designated by a specific integer. The integer "zero" is not used to specify a control point, but rather is used to initialize the subdivision processor. Accordingly, the RAM is programmed such that when a zero is applied to the control point name bus 54, the RAM will assert a "one" in the register clear line 72. The effect of a "one" in the register clear line 72 is to set the contents of the register 86 to "zero".

The first operation of the subdivision processor P1 is an initialization operation. This initialization is directed by means of a "zero" applied to the control point name bus 54.

During a subsequent operation, a signal specifying the value of control point V200 appears in the bus 52 concurrently with a signal in the name bus 54 identifying that control point. Relating to the control point V200, when such signals appear, the RAM 66 provides a signal representative of unity or "one" in the coefficient bus 68. Consequently, the value representative of the control point V200 appearing in the bus 52 is multiplied by unity in the multiplier 76 and accordingly is supplied as its value through the product bus 78 to the adder 80. Note that the register 86 was previously cleared at the beginning of the generation operation (clear line 72) and accordingly the value of V200 is set in the register 86 under control of a signal in the line 70.

During a subsequent operation, the control point V110 (FIG. 2) is designated by a signal in the name bus 54 and the value thereof is manifest by a signal in the output bus 52. Responding to that control point, the RAM 66 provides a multiplier of two to the coefficient bus 68. Consequently, the value of the control point V110 is multiplied by two, the product being supplied through the product bus 78 to the adder 80 which now functions to combine the value of V200 (from the register 86) with the product of 2V110. Accordingly, the register 86 now registers a quantity: (V200+2V 110).

In due course, a designation of the control point V020 is received in the name bus 54 concurrently with the value of the control point being received in the output bus 52. Again, in response to the designation of the control point, the RAM 66 provides a unity or "one" coefficient to the multiplier 76 with the result that the actual value of V020 is supplied from the multiplier 76 through the product bus 78 to the adder 80. In the next phase of operation, the quantity V020 (from the multiplier 76) is added to the quantity V200+2V110 (from the register 86) to produce the quantity: (V200+2V110+V020) in the register 86.

When all of the patch control points have been received, the operational phase of output from the host computer to the subdivision processors is complete. The next operational phase is that of input from the subdivision processors to the host computer. During this phase, the names of subpatch control points are applied sequentially to the control point name bus 54 by the host computer. When the name P020 is applied to this bus, the RAM 66 supplies a "four" to the divider 90 by means of the coefficient bus 68 which prompts the division of the quantity (V200+2V110+V020) by four. The resulting quotient appearing in the quotient bus 92 is a signal representation of P020. Again under control of the RAM 66, the line 74 passes an enable signal to the gate 94 with the consequence that signals representative of P020 are supplied through the input bus 58 to the host computer 50 (FIG. 1).

The operations described above are sequenced in time under control of the RAM 66 as explained. However, in that regard, an indication of the program for the RAM 66 is set out below in tabular form and in time sequence. The first column of the following chart designates sequencing time intervals 1 through 8. The subsequent columns designate signal content provided on various lines and buses to develop the values indicated at the right side of the chart during the indicated actions of the final column.

| OPERATION SUMMARY - FIG. 4 | | | | | | | | | | |
|---|---|---|---|---|---|---|---|---|---|---|
| Time 1 | 2 | 3 | 4 | 5 | 6 | 7 | 8 | 9 | Register 10 | Comment 11 |
| 1 | | 0 | | | | 0 | 1 | 0 | 0 | Initialize |
| 2 | 0 | V200 | V200 data | | 1 | 1 | 0 | 0 | V200 | Accumulate |
| 3 | 0 | V110 | V110 data | | 2 | 1 | 0 | 0 | V200+2V110 | Accumulate |

-continued
OPERATION SUMMARY - FIG. 4

| Time 1 | 2 | 3 | 4 | 5 | 6 | 7 | 8 | 9 | Register 10 | Comment 11 |
|---|---|---|---|---|---|---|---|---|---|---|
| 4 | 0 | V101 | V101 data | | | 0 | 0 | 0 | V200+2V110 | Do nothing |
| 5 | 0 | V020 | V020 data | | 1 | 1 | 0 | 0 | V200+2V110+V020 | Accumulate |
| 6 | 0 | V011 | V011 data | | | 0 | 0 | 0 | V200+2V110+V020 | Do nothing |
| 7 | 0 | V002 | V002 data | | | 0 | 0 | 0 | V200+2V110+V020 | Do nothing |
| 8 | 1 | P020 | | P020 data | 4 | 0 | 0 | 1 | V200+2V110+V020 | Put P020 on control point input bus |
| 9-22 | 1 | Other P,Q,R,S | | Other P,Q,R,S data | | 0 | 0 | 0 | V200+2V110+V020 | Do nothing |

Column representations in the above chart are as follows:

| Column No. | |
|---|---|
| 1 | Time intervals, e.g. T1–T22. |
| 2 | Binary signal on input/output control line 56. |
| 3 | Control point name bus 54. |
| 4 | Control point output bus 52. |
| 5 | Control point input bus 58. |
| 6 | Coefficient bus 68. |
| 7 | Binary signal in register load line 70. |
| 8 | Binary signal in register clear line 72. |
| 9 | Binary signal in gate enable line 74. |
| 10 | Accumulated value in register 86. |
| 11 | Functional operation. |

While only rows 1 through 8 are elaborated in the above chart, the operation would actually constitute some twenty-two intervals to accomplish the computation and input to the host computer of each of the subpatch control points as illustrated in FIG. 2b. That is, in accordance with the above assumptions, all subpatch control points were generated in the initial seven time intervals. The following fifteen time intervals (8-22) are required to input the subpatch control points to the host computer. In that regard, it is to be noted that the order in which the control points are provided or received by the host computer 50 is unimportant because in the system of FIG. 3, each control point is specified by name in the form of a representative signal.

Further with respect to the system of FIG. 3, it is to be appreciated that each subdivision processor P (specifically processors P1 and P2 through Pn) is identical to each other subdivision processor. That is, the tailoring of an individual subdivision processor for the calculation of a specific control point is accomplished by means of the program loaded into the RAM 66. Thus, the RAM 66 of each subdivision processor contains a different program. While this use of RAM provides a rather general solution to the subdivision problem, this generality is achieved at the expense of a somewhat large RAM. The RAM 66 may be replaced with a significantly more compact programmable logic array (PLA). Such PLAs are well known in the prior art related to integrated circuits. A PLA differs from a RAM in that different programs cannot be loaded into it; rather, it has one program built into it, and this program cannot be changed. Using a PLA implementation, each subdivision processor P would differ from all other subdivision processors in two respects. First, the RAM 66 would be replaced by a PLA unique to each subdivision processor, which PLA would generate unique signals in response to receiving signals from the host computer 50 to accomplish the desired manipulations for that subdivision processor. Thus, each subdivision processor would calculate one control point only. Second, the divider, as the divider 90, in each processor P would divide by one divisor only. That is, the calculation of a unique control point involves division by a unique divisor. Since each subdivision processor would calculate a unique control point, that subdivision processor would perform division by the unique divisor specific to that control point. For example, in the previously discussed calculation of the control point P200, division by four was required. However, the processor P for computing:

$$R101 = (V101 + V002)/2$$

would require division by two. For such a computation, the assigned processor would have a unique program in its PLA replacing the RAM 66. Also, division would be by two rather than four as described above with reference to the processor P1.

As indicated above, the individual equations for computing the different control points of a subpatch vary considerably; however, certain properties exist between those equations which can be exploited in a subdivision processor. For example, consider the two equations of the subdivision illustrated in FIG. 2:

$$P020 = (V200 + 2V110 + V020)/4$$

$$R101 = (V101 + V002)/2.$$

Figure 5:
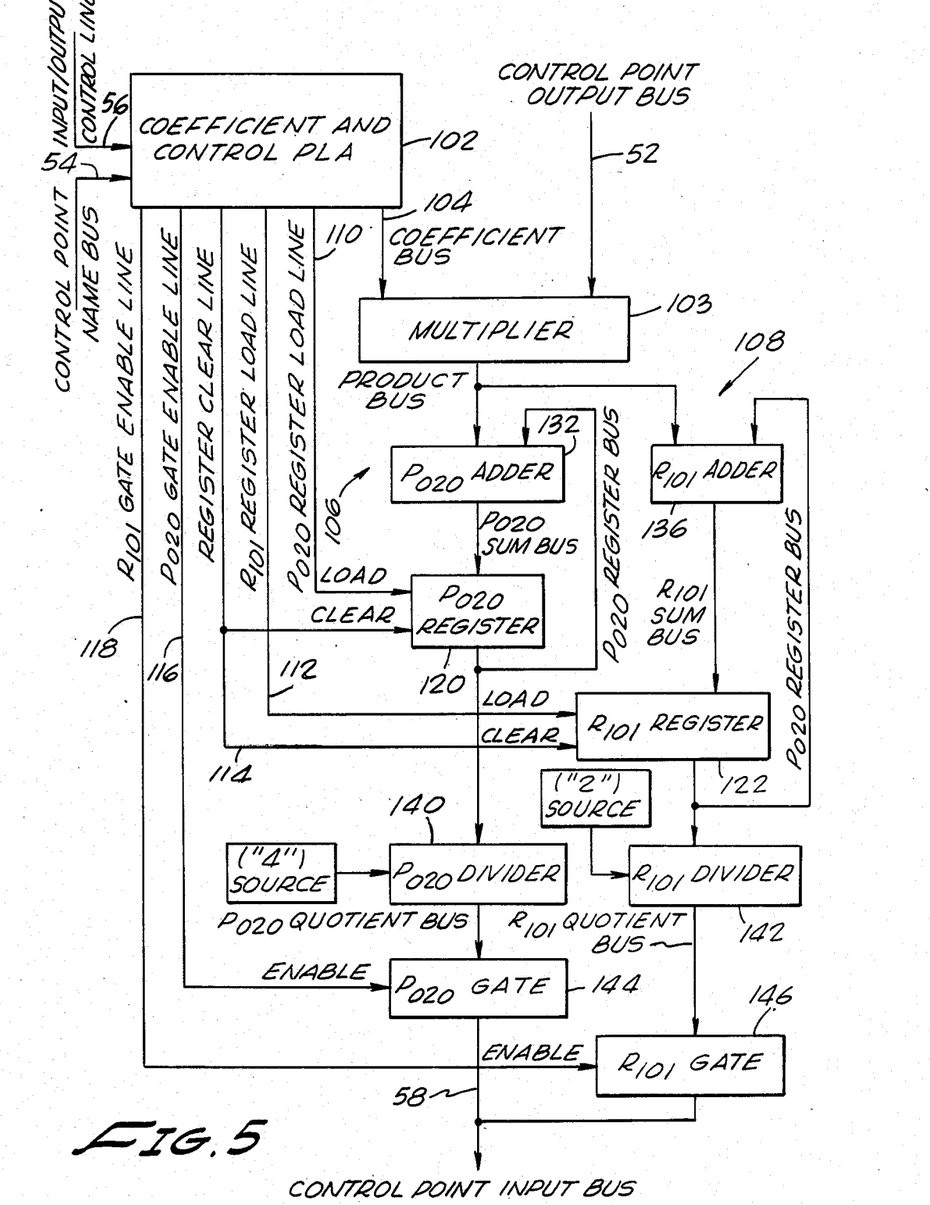
FIG. 5 is a block diagram representative of an alternative component of the system of FIG. 3.

The two equations are significant in that the control points of the patch V do not intersect. That is, the subset of control points used to compute P020 does not intersect with the subset of control points used to compute R101. Consequently, a single processor can be employed to compute both the subpatch control points P020 and R101 providing the processor is equipped with distinct and separate registers and includes a minor amount of additional operating circuitry. In that regard, the two computation structures can share a control PLA and a multiplier. Those elements constitute a major portion of the processor. Accordingly, such a structural arrangement is advantageous. A form thereof is illustrated in FIG. 5.

As before, previously identified components are designated by identical reference numerals. In that regard, FIG. 5 shows an input/output control line 56 (upper left) above a control point name bus 54. Those signal paths are coupled to a coefficient and control programmable logic array (PLA) 102 of the type described above.

The PLA 102 provides several binary control signals individually to a set of control lines. Also, it provides coefficient values to a multiplier 103 through a coefficient bus 104. The multiplier 103 also receives control point signals through the output bus 52.

Generally, the multiplier 103 accomplishes multiplications in executing control point formulas, supplying products to separate apparatus for developing the subpatch control points R101 and P020 separately. That is, signals from the multiplier 103 are applied to an apparatus channel generally indicated by the reference numeral 106 for developing the control point P020. Signals from the multiplier 103 are also supplied to an apparatus channel generally indicated by the numeral 108 for computing the subpatch control point R101. Each channel includes separate structures as treated in detail below. The operation of the system of FIG. 5 involves the development of the control points P020 and R101 independently in the channels 106 and 108 somewhat as described with reference to the system of FIG. 4. Accordingly, in the chart format as explained above, the operation of the system of FIG. 5 to accomplish signals representative of the control points P020 and R101 in the control point input bus 58 is summarized in the following chart:

Column 5 shows the contents of the control point input bus 58 at certain time intervals.

Column 6 shows the content of the coefficient bus 104 at certain intervals.

Column 7 designates the binary signal in the P020 register load line 110.

Column 8 indicates the binary signal for the R101 register load line 112.

Column 9 indicates the binary signal in the register clear line 114.

Column 10 indicates the contents of the P020 gate enable line 116.

Column 11 indicates the contents of the R101 gate enable line 118.

Column 12 indicates the contents of the P020 register 120.

Column 13 indicates the contents of the R101 register 122.

Although the above chart provides a tabular summary of the operating sequence for the system of FIG. 5, a detailed description will afford a complete understanding. Accordingly, assume the apparatus of FIG. 5 is coupled to receive signals as described above from a host computer 50 (FIG. 3). The operation of the system of FIG. 5 to accomplish representations of the control points P020 and R101 will now be described somewhat concurrently with the introduction of structural elements not previously introduced. As in the system of FIG. 4, the subdivision processor is initialized by providing a "zero" signal in the control point name bus 54. In response to this signal, the PLA 102 provides a "one" signal in the register clear line 114. The effect of this "one" is to set the contents of the P020 register and the contents of the R101 register to "zero".

| Time 1 | 2 | 3 | 4 | 5 | 6 | 7 | 8 | 9 | 10 | 11 | P020 Register 12 | R101 Register 13 |
|---|---|---|---|---|---|---|---|---|---|---|---|---|
| 1 |   | 0 |   |   |   | 0 | 0 | 1 | 0 | 0 | 0 | 0 |
| 2 | 0 | V200 | V200 data |   | 1 | 1 | 0 | 0 | 0 | 0 | V200 | 0 |
| 3 | 0 | V110 | V110 data |   | 2 | 1 | 0 | 0 | 0 | 0 | V200+2V110 | 0 |
| 4 | 0 | V101 | V101 data |   | 1 | 0 | 1 | 0 | 0 | 0 | V200+2V110 | V101 |
| 5 | 0 | V020 | V020 data |   | 1 | 1 | 0 | 0 | 0 | 0 | V200+2V110+V020 | V101 |
| 6 | 0 | V011 | V011 data |   |   | 0 | 0 | 0 | 0 | 0 | V200+2V110+V020 | V101 |
| 7 | 0 | V002 | V002 data |   | 1 | 0 | 1 | 0 | 0 | 0 | V200+2V110+V020 | V101+V002 |
| 8 | 1 | P020 |   | P020 data |   | 0 | 0 | 0 | 1 | 0 | V200+2V110+V020 | V101+V002 |
| 9 | 1 | R101 |   | R101 data |   | 0 | 0 | 0 | 0 | 1 | V200+2V110+V020 | V101+V002 |
| 10-22 | 1 | Other P,Q,R,S |   | Other P,Q,R, S data |   | 0 | 0 | 0 | 0 | 0 | V200+2V110+V020 | V101+V002 |

The columns of the above chart designate representations as follow:

Column 1 indicates the time sequences of operation, e.g. T1-T22.

Column 2 indicates the binary signal of the input/output control line 56.

Column 3 shows the contents of the control point name bus 54 at various times.

Column 4 shows the contents of the control point output bus 52 at different times.

As in the system of FIG. 4, assume a predetermined sequence for signals representative of control points for the patch V. That sequence is set out in Column 3 of the above chart, specifically the sequence is: V200, V110, V101, V020, V011, and V002.

With the occurrence of the initial control point signals (representative of V200, during time interval 2), the PLA 102 is actuated. Specifically, the control point V200 is recognized for the computation of the subpatch control point P020. Accordingly, a value of "one" appears on the coefficient bus 104 actuating the multiplier 103 to multiply the value of the control point V200 and supply the result to the P020 adder 132. As the P020 register was previously cleared by the register clear line 114, the value of V200 is set in the P020 register 120.

On the occurrence of signals representing the control point V110, the system is again active. Specifically, the PLA 102 supplies a coefficient value of "two" to the multiplier 103 which also receives the value of the control point V110. As a result, the product 2V110 is added to the quantity V200 by the adder 132, the sum being placed in the P020 register 120. The partially computed value for the subpatch control point P020 is held in the register 120 awaiting the next pertinent signal representative of a control point of the patch V which is employed in that computation.

Upon the occurrence of the signal representative of the control point V101, the apparatus 108 (FIG. 5) begins the computation of the subpatch control point R101. This operation is indicated in the above chart, tabulated at interval four. Specifically, the PLA 102 provides a coefficient "one" unity to the multiplier 103 so that the value of the control point V101 is supplied to a R101 adder 136. Note that the register 122 was previously cleared with the consequence that the value of control point V101 is set in the register 122. Note also that the P020 register 120 is inactive during this interval as it does not receive a load command signal from the line 110.

The numerators of the control points P020 and R101 are thus developed stage-by-stage in the registers 120 and 122 as the relevant control points of patch V are supplied. When so developed, a pair of dividers 140 and 142 perform the requisite divisions to accomplish signals representative of the control points P020 and R101 respectively. These signals are respectively gated from the dividers 140 and 142 by control gates 144 and 146 to the control point input bus 58.

From the above consideration of the structure of FIG. 5 it may be seen that a single processor P (FIG. 3) may compute multiple subpatch control points without loss of time. To recap such operations, as summarized in the above chart, during time intervals 2, 3, and 5 the register 122 is inhibited by "zero" signals (Column 8 of chart). At those times, the host computer places control point names V200, V110, and V020 respectively on the control point name bus 54 (Column 3). Since these control points are used in the computation of control point P020, during each of these time intervals (times 2, 3, and 5) the PLA 102 places the required weighting coefficient on the coefficient bus 104. Thus, the P020 register 120 accumulates (V200+2V110+V020). See Column 12.

During the time intervals 4, 6, and 7, the PLA 102 places zero on the P020 register load line 110 to inhibit the register 120. See Column 7 in the chart. During the time intervals 4 and 7, the host computer places control point names V101 and V002, respectively on the control point name bus 54 and supplies the accompanying numerical data to the control output bus 52. As these values are employed in the computation of the control point R101, during each of the time intervals, the PLA 102 supplies the required weighting function on the coefficient bus 104. Thus, the R101 register 122 accumulates (V101+V002). See Column 13.

During time intervals 8 through 22, the host computer 50 (FIG. 1) supplies "one" on the input/output control line 56 (Column 2) to indicate that it will read one control point from the control point input bus during each of these time intervals. During time interval 8, the host computer places the control point name P020 on the control point name bus 54 (Column 3) to indicate that it will read this control point data from the control point input bus 58 during the time interval. In response, the PLA 102 places a "one" signal on the P020 gate enable line 116 (Column 10) which causes the P020 register 120 contents to be divided by four and gated to the control point input bus.

During the time interval 9, the host computer places control point name R101 on the control point name bus 54 (Column 3) to indicate that it will read this control point data from the control point input bus 58 during the time interval. In response, the PLA 102 places a "one" signal on the R101 gate enable line 118 which causes the R101 register 136 contents to be divided by "two" and gated onto the control point input bus 58.

During the time intervals 10 through 22, the host computer places control point names other than those of the P020 and R101 on the control point name bus. In response to such signals, the PLA 102 supplies binary representative signals zero to the gate enable lines 116 and 118 inhibiting the operation of the structure of FIG. 5 while the structure of other processors provide signals representative of the required P, Q, R, or S control points to the host computer via the control point input bus 58.

While the system of FIG. 5 illustrates the function of a subdivision processor to compute multiple control points (utilizing non-intersecting subsets), a situation exists in which a single processor may compute control points for equations with intersecting subsets of control points. Such a situation occurs when the control points, e.g. control points V (FIG. 2), are multiplied by the same weighting coefficients in all the equations implemented in the subdivision processor. For example, consider the computation of control points:

$$P110 = (V200 + 2V110 + V020)/4$$

$$P101 = (V200 + 2V101 + V002)/4.$$

Note that both equations utilize the quantity V200. Also, the weighting coefficient applied to V200 is the same in each equation. Thus, using the principles described with reference to FIGS. 4 and 5, despite the intersection, P110 and P101 could be computed by a single subdivision processor.

To this point, only subdivision formulas for a uniform one-to-four subdivision of a quadratic triangular Bezier patch have been discussed. As explained above, these equations use weighting coefficients of one and two. In general, uniform one-to-four subdivision of the nth order, triangular Bezier patch uses coefficients of the nth-order binomial expansion. For example, the subdivision equation for the uniform one-to-four subdivision of a tenth-order triangular Bezier patch involves coefficients ranging from one to two hundred fifty-two. Also, subdivision formulas for uniform subdivision of a Bezier patch include division by integer powers of two. In another implementation, uniform subdivision of a Bezier patch could be accomplished using weighting coefficients which were fractions created by the division of binomial coefficients by integer powers of two. Such an implementation would not require use of a divider such as divider 90.

In that regard, nonuniform subdivision is also possible. In general, nonuniform subdivision would require division by divisors other than integer powers of two. Furthermore, subdivisions of: one-to-two, one-to-three, and one-to-n are possible. Also, subdivision is not restricted to quadratic patches but applies to patches of any polynomial order. Subdivision is not restricted to patches with triangular topology but also applies to patches having rectangular and other topologies. Additionally, subdivision is not restricted to patches of the Bezier basis but applies as well to patches of other bases, for example, the Hermite and B-spline basis. In that regard, a wide variety of different processors to accommodate a wide variety of different subdivisions will be apparent utilizing the concepts as explained herein.

As another consideration, examination of the subdivision formula for a given patch will reveal that some of the individual formulas compute control points on the interior of the patch, while others compute control points on the edge of the patch. The control points on the edge of the patch describe a space curve, and the formula computing those control points describe subdivision of a space curve. Consequently, a subset of the parallel subdivision processors also may be used to subdivide space curves if so directed by the host computer 50. Specifically, the host computer would direct subdivision of a space curve as follows. First, it would output to the subdivison processors only those control points on a particular edge of the patch. Then it would input from those processors only those control points on that same edge of the subpatches. Accordingly, the entire set of parallel subdivision processors may be used to subdivide either patches or space curves.

Some detailed explanation of a hardware implementation for variations in parallel subdivision processors will now be provided. First, the separate control point output bus and input bus (e.g., buses 52 and 58, FIG. 5) may be replaced by a single bus. An examination of the subdivision process as explained above will reveal that the host computer does not output and input control point signals during the same interval. Accordingly, a single bidirectional bus may be employed as an output bus during certain time intervals and an input bus during other time intervals.

As another consideration, it is noteworthy that the registers, e.g., register 120, FIG. 5, are not set to zero on initialization. An examination of the division used in the subdivision computation will reveal that computational inaccuracies may be minimized by setting each register to a rounding factor upon initialization. The specific rounding factor depends on the integer power of two by which the register contents are to be divided. In general, the rounding factor is equal to one-half of the divisor. For example, if a divisor of four is to occur, then a rounding factor of two is preferably employed.

As another consideration, it is noteworthy that when control point data is represented in integer format and when division is required by integer powers of two, the dividers, e.g., divider 140, FIG. 5, may be replaced by a shifter. In general, a shifter is simpler than a divider.

As still another consideration, it is significant to recognize that the subdivision equations or formulas for an Nth-order patch include most of the subdivision formulas for patches of the orders one through N-1. Accordingly, the equation for a tenth-order patch includes most of the subdivision formulas for the first through ninth order patches. The subdivision formulas for first through ninth-order patches which are not included in the subdivision formula for the tenth-order patch are also implemented in the parallel subdivision processors. Thus, first through tenth-order patches may be subdivided.

As indicated above, the convenient mathematic naming convention described with respect to FIG. 2 normally would not be employed in coding signal representations. Rather, a convention would be implemented wherein the control point names are simply integers from one to N. In the disclosed embodiment, the control point names used might be integers ranging from one to two hundred ninety-nine. The integer zero is not used as a control point name but is reserved for an initializing command.

Recognizing that control points are identified simply by numbers leads to another aspect of the present invention. Specifically, under certain circumstances, the control point name bus (bus 54, FIGS. 4 and 5) could be eliminated in favor of adopting a meaningful sequence (canonical) of outputting control point signals. That is, if signals representative of control points are provided in a predetermined arrangement, it is not necessary to provide identifications via the control point name bus. In this case each subdivision processor P includes a counter to count, say from one to six. The counter is initialized on initial command, then during each time interval the subdivision processor's counter contains the name of the control point for which data is provided from the host computer. For example, if the counter contents were three, the subdivision processor would treat the control point data as a control point V101 in the above example. However, replacing the control point name bus with a counter in each subdivision processor is practical only when the control point signals are ordered consistently in a predetermined canonical sequence as known in the art.

The control point name bus is appropriate in other situations, for example when subdivision of curves is desired as well as the subdivision of patches. Another important use of the control point name bus involves the exploitation of trilateral symmetry in the patch subdivision formula. For example, consider the generation of the following control points:

P110=(V200+V110)/2

Q011=(V020+V011)/2

R101=(V002+V101)/2.

Assume, for example, that a particular subdivision processor is programmed (by its PLA) to respond to signals manifesting the control point names V200 and V110 (FIG. 2b) so as to compute the control point P110. If the data for the control points V020 and V011 is placed on the control point bus during the respective time intervals when the control point names V200 and V110 were placed on the control point name bus, then that particular subdivision processor would actually compute Q011. Similarly, if the data for control points V002 and V101 were placed on the control point output bus during the respective time intervals when control point names V200 and V110 were placed on the control point name bus, then that particular subdivision processor would actually compute R101.

Thus, there is a trilateral symmetry in the subdivision formulas. FIG. 2b shows a one-to-four subdivision of a quadratic triangular Bezier patch. As indicated by the dashed lines in the drawing, the symmetry extends to the possibility of three groups of processors in which the types of the processors in each group are identical. Specifically, one group of subdivision processors, referred to as group P (FIG. 2b) computes P200, P110, P101, P020, S011, and P002. An exact duplicate of these processors, referred to as group Q, computes Q020, Q011, Q110, Q002, S101, and Q200. Still another duplicate of these processors, referred to as group R, computes R002, R101, R011, R200, S110, and R020.

Figure 6:
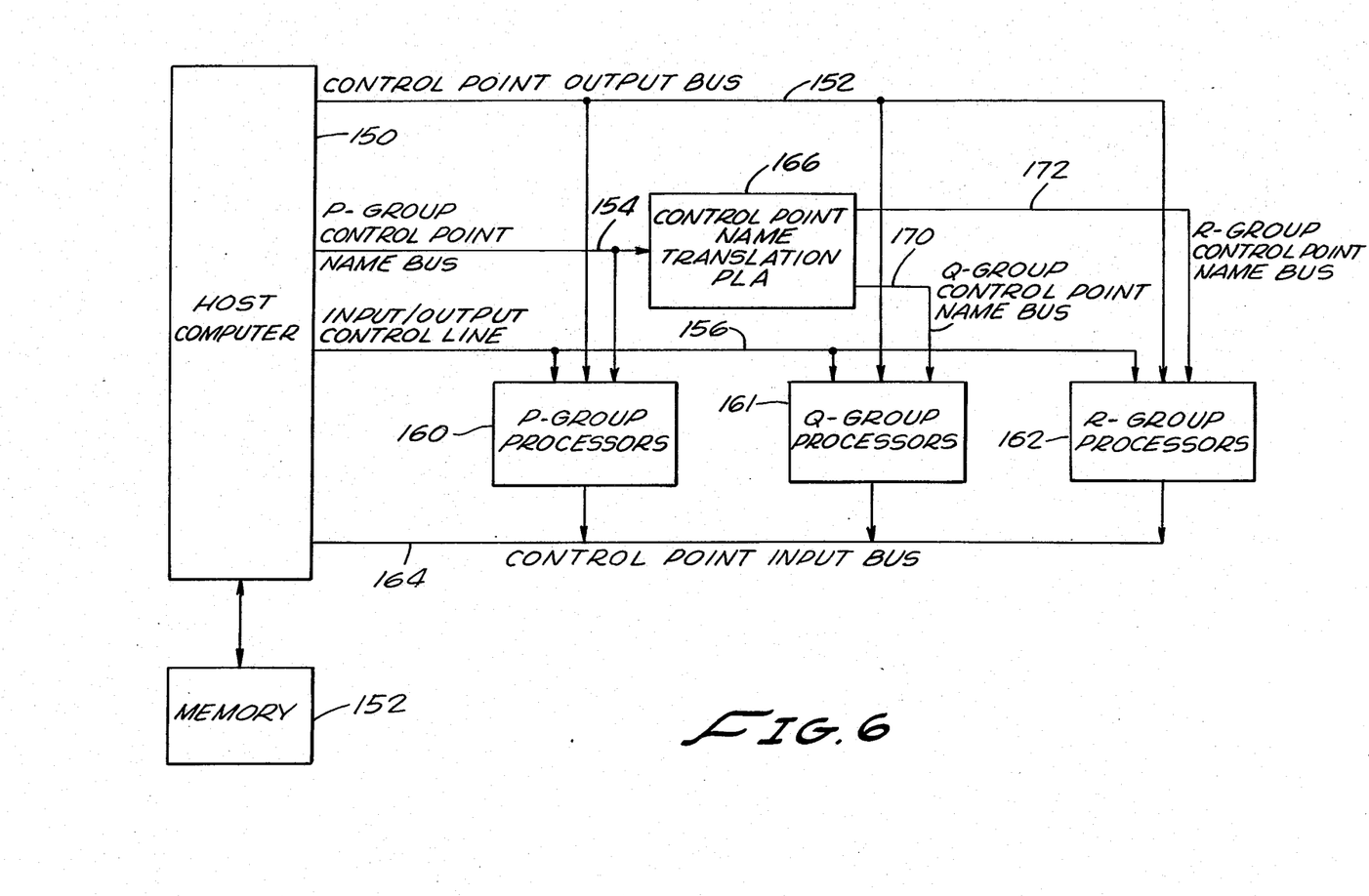
FIG. 6 is a block diagram illustrative of an alternative embodiment of the present invention.

It is often advantageous to manufacture three duplicates of a single group of processors rather than to manufacture as many different types of processors as there are control points to be computed. This manufacturing advantage is the primary impetus for exploiting the trilateral symmetry of the subdivision formula. FIG. 6 depicts a system utilizing three similar groups of processors operating with a host computer.

Considering FIG. 6 in detail, a host computer 150 performs the basic functions previously described above, that is, supplying signals representative of patch control points to output buses and receiving control point signals definitive of subdivided subpatches from an input bus. Generally, the host computer 150 functions in cooperation with a memory 152 wherein control point data is developed, also as described above.

Somewhat as in the system of FIG. 1, the host computer 150 (FIG. 6) supplies signals representative of control point data to a control output bus 152. Additionally, the host computer 150 supplies signals representative of control point names to a bus 154. Finally, the host computer supplies control data (input-output) to a control line 156.

The control point output data is supplied from the bus 152 to each of three sets of group processors 160, 161, and 162. Output signals representative of control points for subpatches are supplied from the sets of processors 160, 161, and 162 to a control point input bus 164 for input to the host computer 150.

Control between the input and output functions is provided by a binary signal on the control line 156. Specifically, the line 156 is connected to each of the sets of processors 160, 161, and 162 and in that regard controls the flow of data either from the bus 152 to the processors or from the processors to the bus 164.

In operation, the processors 160, 161, and 162 are provided with name data on the control points, as described with respect to the previous embodiments. Specifically, the P-group control point name bus 154 is connected directly to the group P processors 160. Connection of the bus 154 is to the group Q processors 161 and the group R processors 162 is through a translation programmed logic array (PLA) 166.

Essentially, the PLA 166 includes a table with a look-up capability for identifying the appropriate name of a control point in each of the group Q and group R calculations associated with the control point name of a group P calculation. That is, the PLA 166 translates the control point name from a group P control point name to control point names which are used by the group Q processors 161 and the group R processors 162. Thus, if the host computer places control point names on the group P control point name bus 154 in the sequence: V200, V110, V101, V020, V011, and V002; the array 116 translates these names and places two different sequences of names on a group Q control point name bus 170 and an group R control point name bus 172. The sequences of names placed on the group R bus 172 would be: V020, V011, V110, V002, V101, and V200. The sequence of names placed on the group Q bus 170 would be: V002, V101, V011, V200, V110, and V020. Accordingly, a simple order rearrangement is provided by the PLA 166.

Note that as all the sets of processors 160, 161, and 162 receive control point data in the same sequence as the control point names appear from the host computer, the control point data is renamed for both the group Q processors 161 and the group R processors 162. As a consequence, the group Q processors 161 and the group R processors 162 accomplish the desired computations thereby exploiting the trilateral symmetry of the subdivision process to reduce the number of different processors incorporated in the system.

To consider a specific example, as indicated above the formula for computing a subpatch control point P020 is:

$$P020 = (V200 + 2V110 + V020)/4.$$

To accomplish the calculation, one processor in each of the groups of processors 160, 161, and 162 would accomplish the formula. Specifically, a component in each of the processors would perform the calculation: $(A+2B+C)/4$. Accordingly, at the time when that component in the group P of processors 160 executed the equation to accomplish P020, a similar component in each of the group Q processors 161 and the group R processors 162 would compute the subpatch control point for Q and R respectively involving the same equation. Thus, trilateral symmetry is exploited in the interests of economy.

Other techniques may be implemented using concepts and methods as disclosed herein. According to one such technique, a group of processors, for example the P-group processors, would be connected to the host computer. Then during a first processing interval, the initial patch control points would be output, one at a time, to the processors via the control point output bus while the names of those control points were output simultaneously to the processors via the control point name bus. In response to these control points with their accompanying names, the processors would compute the group P control points which would then be input to the host computer via the control point input bus. Next, during a second processing interval, the initial patch control points would be output, one at a time, to the processors via the control point output bus, accompanied by the control point names placed in a permuted order on the control point name bus. In response to these control points with their permuted names, the processors would compute the group Q control points which would then be input to the host computer via the control point input bus. Lastly, during a third processing interval, the initial patch control points would be output, one at a time, to the processors via the control point output bus, accompanied by the control point names placed in yet another permuted order on the control point name bus. In response to these control points with their again permuted names, the processors would compute the group R control points which would then be input to the host computer via the control point input bus. Thus, in all the control points would be output three times, accompanied by different permutations of the control point names.

In view of the above descriptions, it will be apparent that other systems in accordance with the present invention may take various different forms. Essentially, parallel processing is characteristic, however as set forth, numerous possibilities exist. Accordingly, the scope hereof should be interpreted in accordance with the claims as follows.

What is claimed is:

1. A system for subdividing parametric patches defined by initial control points to attain control points for subpatches in accordance with established subdivision equations, comprising:
   means for supplying signals representative of said initial control points for a patch to be subdivided;
   a plurality of processors for executing said subdivision equations connected to receive said signals representative of said initial control points for a patch to be subdivided;
   means for controlling said processors to selectively process said signals representative of said initial control points to provide resultant signals representative of control points for subpatches; and
   means for receiving said resultant signals from said processors.

2. A system according to claim 1 wherein said means for supplying signals comprises bus means for supplying said signals representative of said initial control points in sequence for selective use by said processors.

3. A system according to claim 2 wherein said means for receiving said resultant signals comprises a means for passing said resultant signals in sequence.

4. A system according to claim 1 wherein said plurality of processors comprises a processor for each of said control points for subpatches to be generated.

5. A system according to claim 1 wherein said plurality of processors comprise less than one processor for each of said control points for subpatches and wherein certain of said processors include structure for computing a plurality of said control points for subpatches.

6. A system according to claim 1 wherein said plurality of processors each comprise substantially similar structures each for generating a plurality of said control points for subpatches.

7. A system according to claim 1 wherein said means for supplying signals representative of said initial control points includes means for providing signals representative of a name for said initial control points and means for providing signals representative of the value of data for said initial control points.

8. A system according to claim 1 wherein said processors include logic means for selectively accepting said signals representative of said initial control points.

9. A system according to claim 8 wherein said logic means includes a counter.

10. A system according to claim 1 wherein said means for supplying signals comprises bus means for supplying said signals representative of said initial control points in sequence for selective use by said processors and wherein said means for receiving said resultant signals comprises a means for passing said resultant signals in sequence.

11. A system according to claim 10 wherein said plurality of processors comprises less than one processor for each of said control points and wherein certain of said processors include structure for computing a plurality of said control points for subpatches.

12. A system according to claim 10 further including control means to subdivide space curves.

13. A system according to claim 1 wherein said means for receiving resultant signals representative of control points for subpatches includes means for providing signals representative of a name for said control points for subpatches and means for receiving signals representative of the value of data for said control points for subpatches.

14. A system according to claim 1 wherein said processors include logic means for selectively transmitting said signals representative of said control points for subpatches.

15. A system according to claim 14 wherein said logic means includes a counter.

16. A system according to claim 1 wherein said means for controlling includes a RAM.

17. A system according to claim 1 wherein said means for controlling includes a PLA.

18. A system according to claim 1 wherein said processors comprise multiple groups of processors and said groups are substantially identical.

19. A system according to claim 1 wherein processors comprise a single group of processors and wherein said means for supplying signals comprises means for repeatedly supplying said initial control points whereby upon each such supplying, said processors compute a different set of control points for subpatches.

* * * * *